(12) United States Patent
Yurchision et al.

(10) Patent No.: US 6,186,174 B1
(45) Date of Patent: *Feb. 13, 2001

(54) VALVE ASSEMBLY

(75) Inventors: Peter P. Yurchision, Shavertown, PA (US); Alan W. Brownlie, Pagosa Springs, CO (US); Fred A. Marconi, Jr., Morrisville, NY (US)

(73) Assignee: Muskin Leisure Products, Inc., Midway, GA (US)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 08/942,178

(22) Filed: Oct. 1, 1997

(51) Int. Cl.$^7$ ............................ F16K 11/074; F16K 25/00
(52) U.S. Cl. ..................... 137/625.46; 251/163; 251/215
(58) Field of Search ................... 137/625.46, 625.29; 251/161, 162, 163, 215, 229, 230; 210/169, 424, 425, 426

(56) References Cited

U.S. PATENT DOCUMENTS

| | | |
|---|---|---|
| 2,711,302 * | 6/1955 | McWhorter .......................... 251/163 |
| 3,636,981 | 1/1972 | Henry . |
| 3,640,310 | 2/1972 | Erlich . |
| 3,721,268 | 3/1973 | Erlich et al. . |
| 3,809,247 | 5/1974 | Brett . |
| 3,828,932 | 8/1974 | Schneer . |
| 3,834,537 | 9/1974 | Brett . |
| 3,863,675 | 2/1975 | Wiltshire . |
| 3,911,956 | 10/1975 | LeBreton et al. . |
| 4,105,555 | 8/1978 | Pease . |
| 4,115,276 | 9/1978 | Kelly . |
| 4,216,798 | 8/1980 | Tscherner . |
| 4,371,003 | 2/1983 | Goguen . |
| 4,470,429 | 9/1984 | Johnson . |
| 4,523,740 | 6/1985 | Paitchell . |
| 4,545,905 | 10/1985 | Poe . |
| 4,546,787 | 10/1985 | Meyers et al. . |
| 4,550,742 | 11/1985 | Stearns . |
| 4,564,451 | 1/1986 | Cohen . |
| 4,601,307 | 7/1986 | Johnson . |
| 4,674,538 | 6/1987 | Yes . |
| 4,774,977 | 10/1988 | Cohen . |
| 4,869,817 | 9/1989 | Mendoza et al. . |
| 5,118,418 | 6/1992 | Roussel . |

FOREIGN PATENT DOCUMENTS

| | | |
|---|---|---|
| 387268 | 5/1988 | (AT) . |
| 204294 | 11/1983 | (DE) . |
| 3617164 | 11/1987 | (DE) . |
| 4131657 | 3/1993 | (DE) . |
| 4321034 | 1/1995 | (DE) . |
| 0033303 | 8/1981 | (EP) . |
| 0060529 | 9/1982 | (EP) . |

(List continued on next page.)

OTHER PUBLICATIONS

Brochure of Hayward Pool Products, Inc. entitled "Vari–Flo Multiport Valves" (three pages; undated).

*Primary Examiner*—John Rivell
(74) *Attorney, Agent, or Firm*—Dean W. Russell; Kilpatrick Stockton LLP (57) ABSTRACT

Multi-port valve assemblies with, typically, two-piece housings are disclosed. Particularly useful in connection with swimming pools and associated water pumps, the assemblies avoid reliance on an elongated handle to effect rotation of the internal structure of the valve. Instead, the assemblies utilize a knob—which users need not lift—coupled to a post in which an elongated slot is formed. Doing so avoids breakage problems associated with use of elongated handles while reducing wear of internal seals. Each valve assembly additionally may include a cam having non-semicircular, asymmetrically-shaped recesses into which followers attached to a shaft passing through the elongated slot are received.

12 Claims, 8 Drawing Sheets

FOREIGN PATENT DOCUMENTS

| | | |
|---|---|---|
| 0068788 | 1/1983 | (EP) . |
| 0093359 | 11/1983 | (EP) . |
| 0137154 | 4/1985 | (EP) . |
| 0145545 | 6/1985 | (EP) . |
| 0157847 | 10/1985 | (EP) . |
| 0176828 | 4/1986 | (EP) . |
| 0227204 | 7/1987 | (EP) . |
| 0231567 | 8/1987 | (EP) . |
| 0231568 | 8/1987 | (EP) . |
| 0287457 | 10/1988 | (EP) . |
| 0289444 | 11/1988 | (EP) . |
| 0411368 | 2/1991 | (EP) . |
| 0468606 | 1/1992 | (EP) . |
| 0476546 | 3/1992 | (EP) . |
| 1578675 | 11/1980 | (GB) . |

* cited by examiner

VALVE ASSEMBLY

FIELD OF THE INVENTION

This invention relates to a valve and more particularly to a multi-position valve assembly especially, although not exclusively, adapted for use in connection with swimming pools and associated water pumps.

BACKGROUND OF THE INVENTION

U.S. Pat. No. 4,470,429 to Johnson describes an exemplary multi-port valve for use in the care and treatment of swimming pools. The two- and three-way valves of the Johnson patent include a unitary housing and a lever arm splined onto the stub of a shaft. Rotating the lever arm causes a "valve closure sealing surface" of a "closure plug" to move within the structure between various of the hubs or ports. According to the Johnson patent, the sealing surface carries both a "seal member" and an "arcuate retainer plate," the latter of which is attached to the closure plug using screws. Because the housing is unitary and the fluid passageways extend radially from it, the closure plug need never be lifted from any seated position.

U.S. Pat. No. 3,640,310 to Erlich, incorporated herein in its entirety by this reference, discloses another multi-port valve in which one or more inlet ports direct pressurized fluid through an "open central portion" to other inlet and outlet ports. Included in the valve is a rotor, which in operation interconnects various of the inlets and outlets. Attached to the rotor via a post is an elongated aluminum handle, whose manual movement is designed to change the position of the rotor. As described at column 9, lines 60–62 of the Erlich patent:

A fulcrum point is provided for the handle, so that when the handle is depressed, the post will axially lift the rotor from its seated position.

(Numerals deleted.) The valve of the Erlich patent additionally incorporates both a Teflon bearing and a metallic bearing plate, which purportedly facilitate rotation of the handle while preventing wear of the bearing. In actual use, however, consumers frequently fail to depress the handle before attempting to rotate it, often breaking (or at least prematurely wearing) the handle or the pin by which it is attached to the post.

Yet another multi-port valve marketed by Praher under the name "Eco-Valve" includes a plastic handle connected to a rotor. Rotating the handle causes a pair of rollers to travel along a plate, the upper surface of which includes four recesses of semi-circular cross-section for receiving the rollers at various intervals. Additionally incorporated into the upper surface are two opposed indentations in which the rollers may rest. Receiving the rollers in the recesses or indentations apparently helps position the rotor correctly relative to the ports of the valve. As with the device of the Erlich patent, some possibility of breaking the plastic handle exists should the force exerted by the user not translate to the rollers in a manner sufficient to permit them to be unseated from their respective recesses.

SUMMARY OF THE INVENTION

The valve assembly of the present invention provides an alternative structure to these existing multi-port valves. Unlike the Eco-Valve and that of the Erlich patent, the present valve assembly includes no elongated handle possibly subject to premature breakage. Instead, the structure utilizes a knob—which the user need not lift—coupled to a post in which an elongated slot is formed.

Through the slot of the post is passed a cylindrical or other appropriately-shaped shaft terminating in a pair of opposed followers, sometimes denominated "rollers," with generally-circular cross-section. The rollers interact with a stationary "cam" having one or more (preferably but not necessarily six) recesses and (preferably but not necessarily two) indentations into which the rollers may be received or rest. Unlike the plate of Praher's Eco-Valve, the cam of the present invention incorporates non-semicircular, asymmetrically-shaped recesses, both to help restrict movement of the knob to one direction (typically counterclockwise) and to facilitate unseating of the rollers when their movement is desired. The elongated slot, whose mouths are longer than the diameter of the shaft, additionally permits the rotor to lift before it turns, momentarily destressing an internal sealing mechanism to reduce or avoid its premature wear.

Embodiments of the valve assembly may include a two-piece housing, with the upper portion generally spherically shaped (albeit truncated) and the lower portion shaped generally as a truncated toroid. In such cases the housing may be divided along or adjacent the plane in which the sealing mechanism resides, with the upper portion having a port for connecting to a pump and the lower portion having multiple inlets and outlets. This design for the housing assists in minimizing the surface area required for the assembly for particular fluid flow rates and volumes, while also matching generally the shape of the surfaces of pressure tanks to which it typically mounts.

Additionally incorporated into certain valve assemblies of the present invention is an "accelerator" gear whose teeth substantially complement those formed in the bottom of the post. The angled edges of the teeth facilitate, and thus effectively "accelerate," proper seating of the post and thereby of the rotor as well. Including vertical sides in the teeth, by contrast, avoids interference with proper lifting of the rotor when the knob is turned.

It is therefore an object of the present invention to provide a valve assembly adapted for use especially, although not necessarily exclusively, in connection with swimming pools.

It is another object of the present invention to provide a multi-port valve assembly lacking an elongated handle, thereby avoiding breakage problems sometimes associated with such handles.

It is an additional object of the present invention to provide a valve assembly having a post to which a knob attaches, the post defining an elongated slot through which a shaft may pass.

It is a further object of the present invention to provide a valve assembly which utilizes a cam having asymmetrical recesses for receiving followers connected to the shaft.

It is yet another object of the present invention to provide a valve assembly in which a rotor connected to the post lifts before it turns, momentarily destressing an internal sealing mechanism to reduce or avoid premature seal wear.

It is also an object of the present invention to provide a valve assembly including a gear whose teeth not only substantially complement those formed in the bottom of the post, but also are shaped to facilitate proper seating of the post and rotor as well.

Other objects, features, and advantages of the present invention will become apparent with reference to the remainder of the text and drawings of this application.

DETAILED DESCRIPTION

Figure 1:
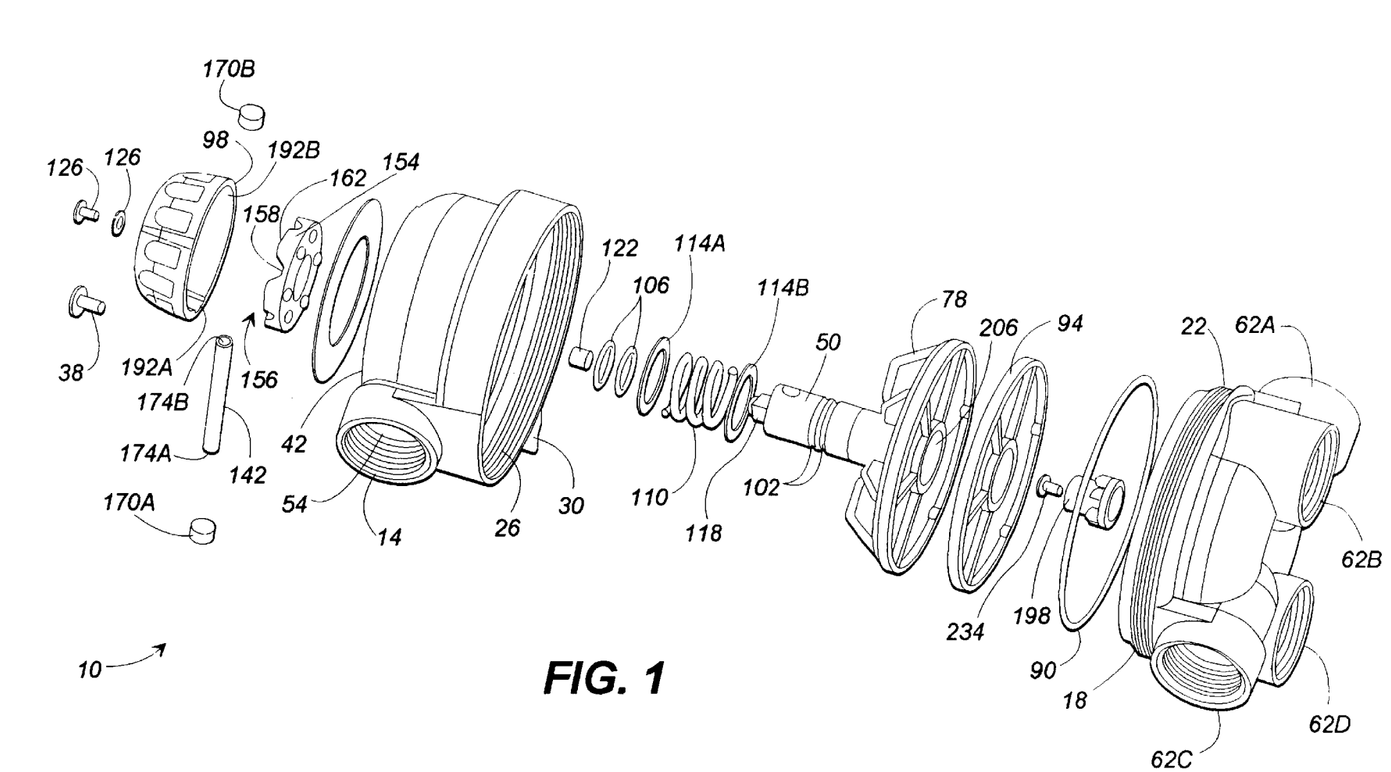
FIG. 1 is an exploded perspective view of a valve assembly of the present invention.
Figure 2:
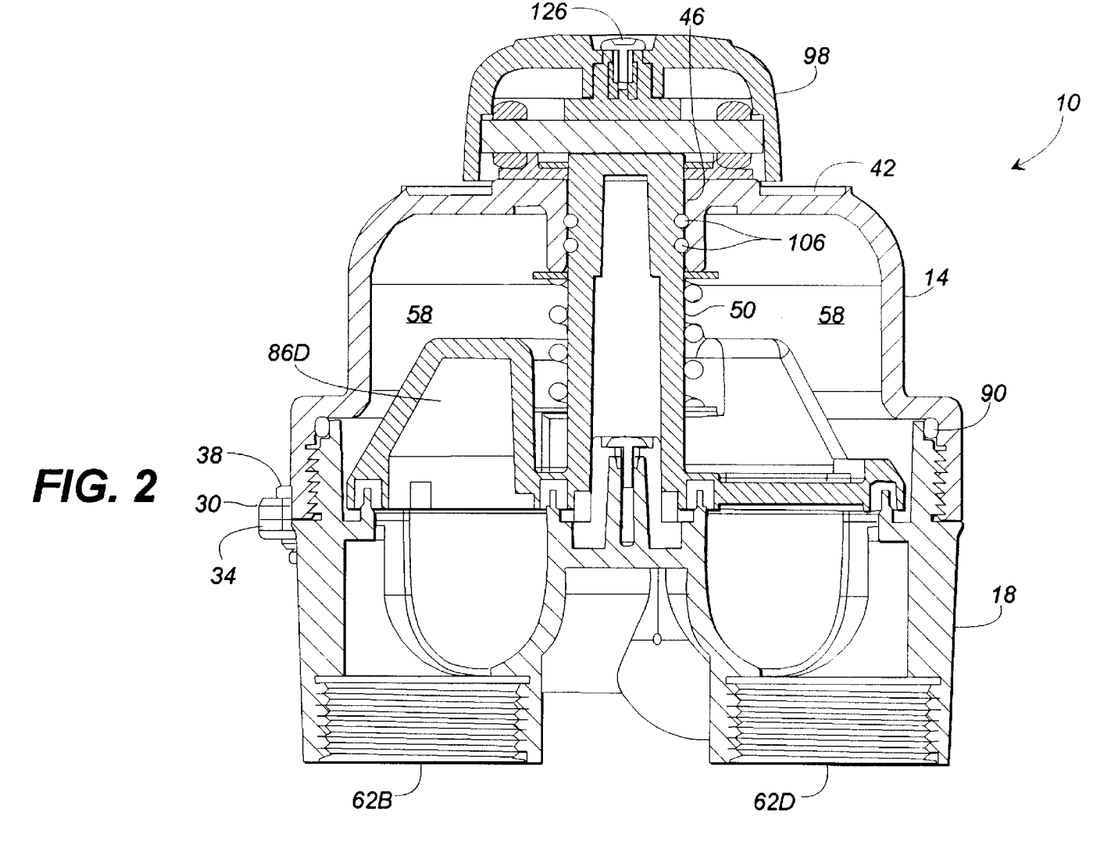
FIG. 2 is a cross-sectional view of the valve assembly of FIG. 1.

FIGS. 1 and 2 illustrate an embodiment of assembly 10 of the present invention. As detailed therein, assembly 10 may include upper housing 14 and lower housing 18 which in use are connected in suitable manner. FIGS. 1–2 show one such connection means, in which external threads 22 of lower housing 18 engage internal threads 26 of upper housing 14. Housings 14 and 18 additionally or alternatively may include respective flanges 30 and 34 through which a fastener such as a pin or screw 38 may pass.

Portions of upper housing 14 resemble a dome or sphere. Included in upper surface 42 of the dome-like housing 14 is an opening 46 through which post 50 protrudes. Also incorporated into housing 14 is inlet 54, which in use typically connects via a hose to a pump or similar equipment. Housing 14 is otherwise generally hollow, defining an area 58 in which water or other fluid may be received. Although not shown in the figures, housing 14 additionally may include an aperture into which a pressure gauge or sensor is mounted.

FIGS. 1–4 illustrate lower housing 18. Embodiments of assembly 10 often define four ports 62A–D, although fewer or greater numbers of ports may be included in housing 18 when necessary or desired. These embodiments additionally contain walls 66A–E, central wall 67, and interior peripheral wall 68, which collectively divide area 70 within housing 18 into five segments 74A–E (one more than the number of ports 62 provided). Each segment 74 is adapted to receive fluid communicated from either inlet 54 or another segment 74 (or both), with its boundary walls 66 and 68 helping to confine the fluid to that particular segment 74.

Figure 3:
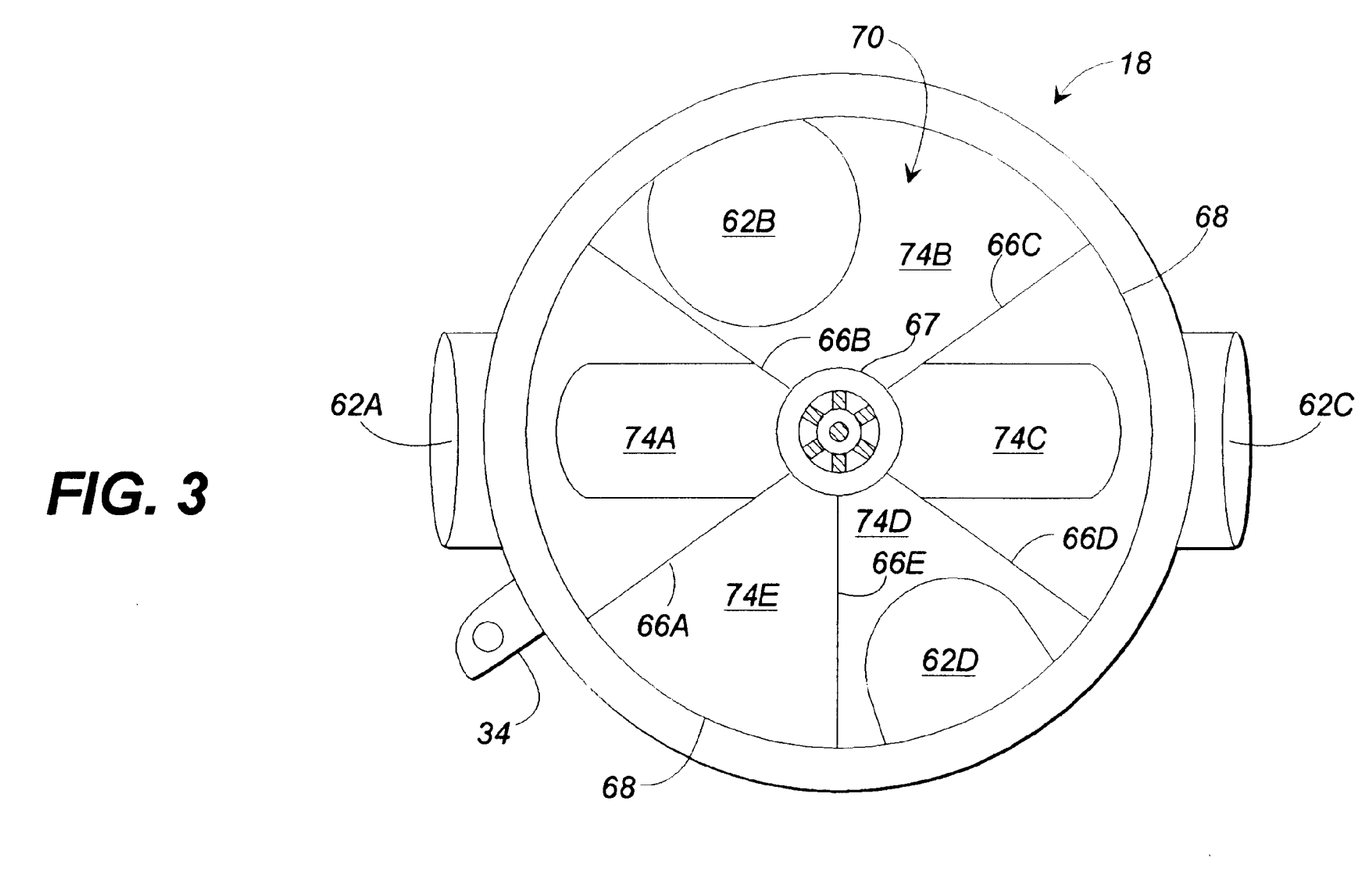
FIG. 3 is a top plan view of the lower housing of the valve assembly of FIG. 1.
Figure 4:
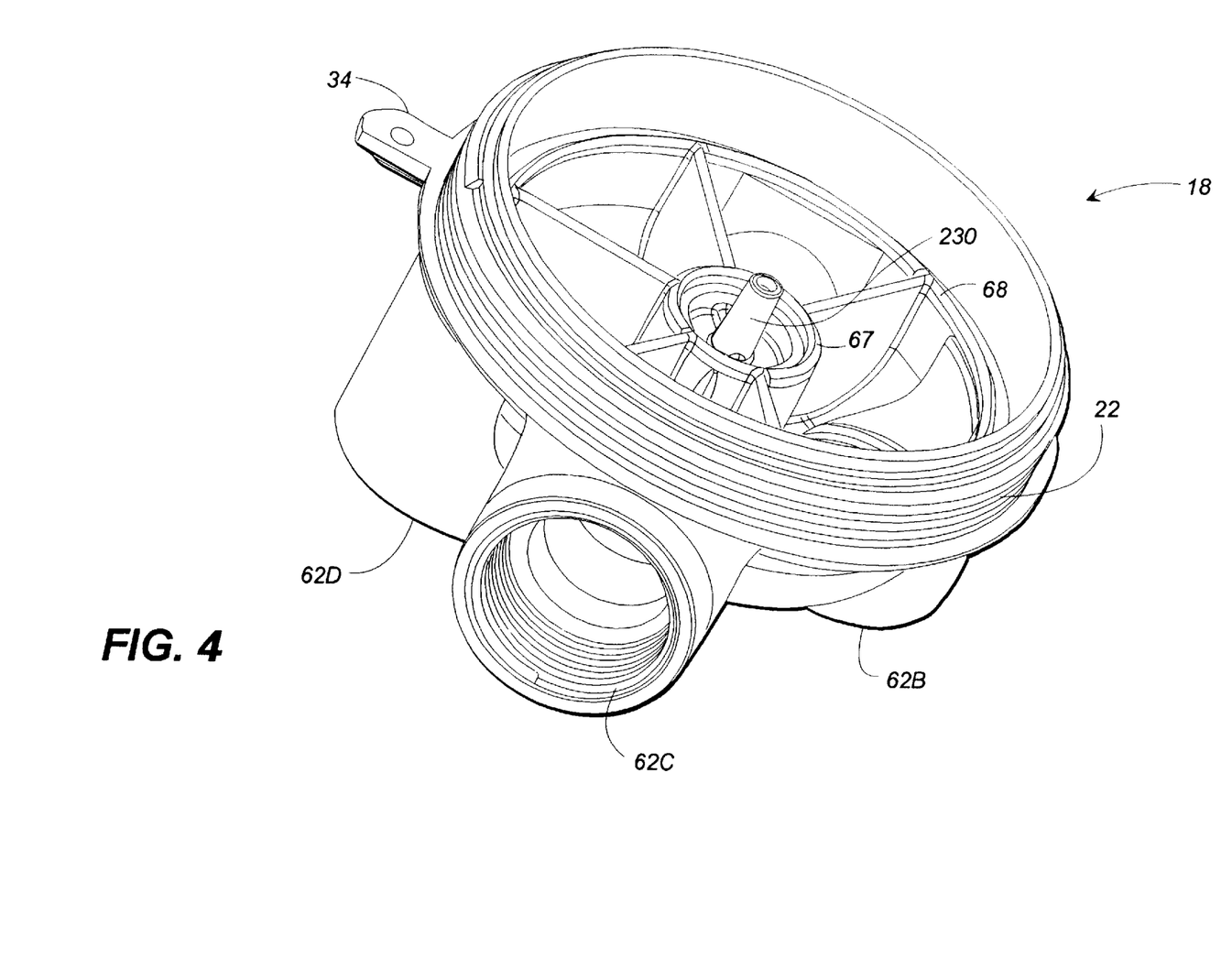
FIG. 4 is a perspective view of the lower housing of FIG. 3.

As examples, together with central wall 67 and peripheral wall 68, walls 66A and 66B define segment 74A, which communicates with port 62A, while walls 66D and 66E define segment 74D in communication with port 62D. In typical swimming pool applications port 62A provides an outlet for waste water, port 62B connects to the outlet of a filter, port 62C provides a direct outlet to the pool, and port 62D connects to the inlet of the filter. Segment 74E, by contrast, although capable of receiving fluid from inlet 54, does not communicate with any of ports 62A–D. It thus corresponds to the "closed" position of valve assembly 10.

Positioned principally within upper housing 14 is rotor 78, which in use rotates to permit (or forbid) fluid to communicate either from upper housing 14 to particular segments 74 of lower housing 18 or from one segment 74 to another within lower housing 18. In the embodiment of rotor 78 shown in FIGS. 5–6, lower surface 82 of the rotor 78 has four areas 86A–D, two of which (86A and 86B) are essentially flat and designed to fit flush against pairs of adjacent walls 66 to prevent fluid from communicating with the segments defined by those walls 66. Area 86C is an opening, which permits fluid to communicate from upper housing 14 to lower housing 18. Area 86D defines a cavity which, although preventing fluid from communicating between housings 14 and 18, is adapted to allow fluid to communicate between adjacent segments 74 with which it is aligned.

Figure 5:
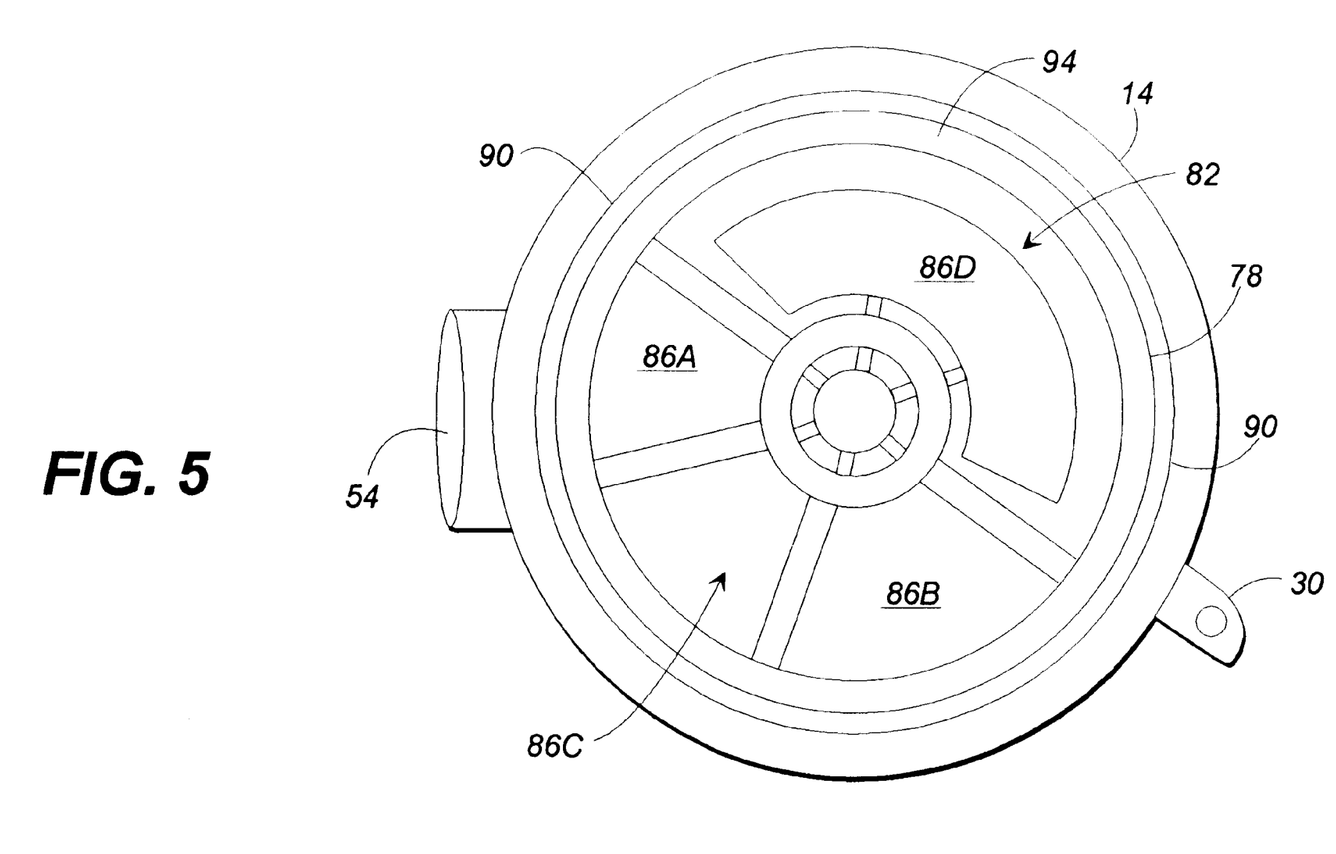
FIG. 5 is a bottom plan view of the upper housing, rotor, and post of the valve assembly of FIG. 1.
Figure 6A:
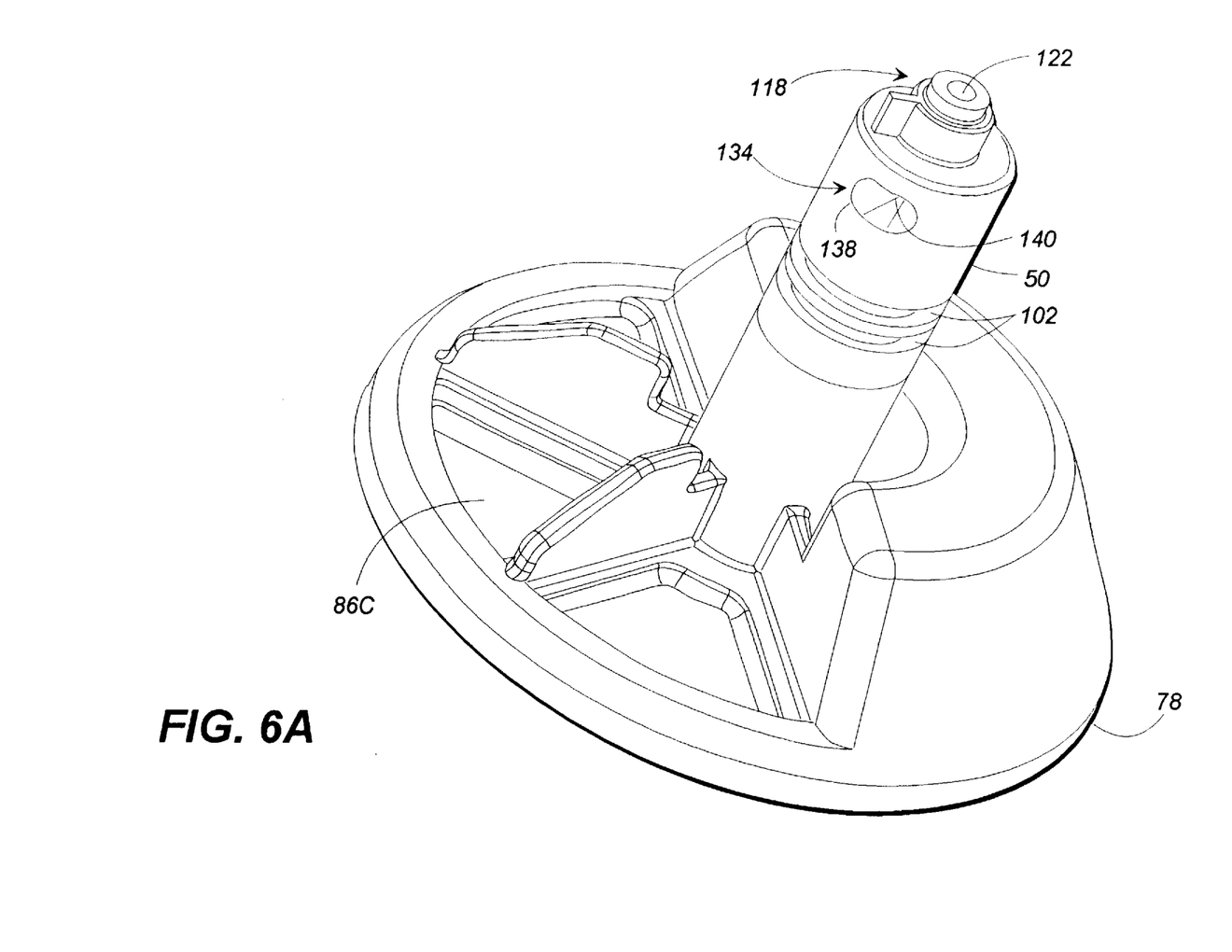
FIGS. 6A–B are perspective views of the rotor and post of FIG. 5.
Figure 6B:
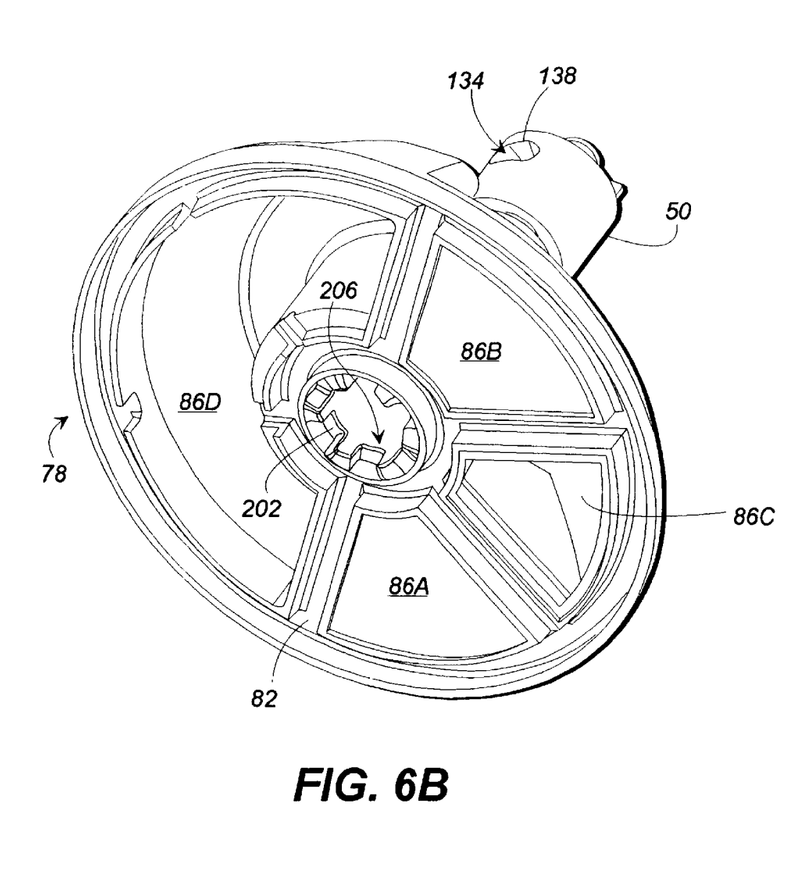

Also illustrated in FIGS. 1–2 and 5 is o-ring 90, which seals the region of assembly 10 adjacent threads 22 and 26 to prevent undesired fluid leakage in that region. Similarly shown is gasket 94, which constitutes a sealing mechanism intended to prevent unwanted fluid exchange between upper housing 14 and lower housing 18. The "spoked" gasket 94 is adapted to abut walls 66A–E, central wall 67, and peripheral wall 68 and in some embodiments of assembly 10 is fitted into rotor 78 for enhanced performance. This fitting additionally facilitates replacement of rotor 78 and gasket 94 as a unit when desirable to do so.

Integrally formed with or otherwise attached to rotor 78 is post 50. Usually (but not necessarily) cylindrical throughout much of its length, post 50 transfers motion of knob 98 to rotor 78. In some embodiments of assembly 10, post 50 may include one or more circumferential grooves 102 into which o-rings 106 may be fitted for additional protection from leakage. Circumscribing portions of post 50 are spring 110 and plates 114A and 114B, which collectively bias gasket 94 against walls 66A–E, central wall 67, and peripheral wall 68.

Protruding through opening 46 as noted earlier, post 50 may include at its top 118 a brass or other threaded insert 122 into which fastener 126 may be fitted. Fastener 126 additionally passes through knob 98, thus securing knob 98 to post 50 for rotational motion. When appropriate, washer 130 may be interposed between fastener 126 and knob 98.

Figure 7A:
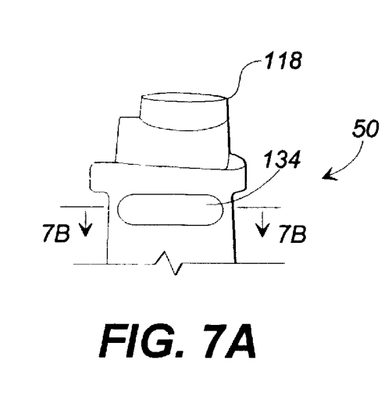
FIGS. 7A–B are, respectively, elevational and cross-sectional views of portions of the post of the valve assembly of FIG. 1.
Figure 7B:
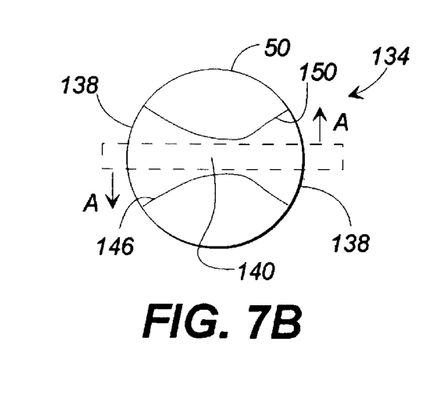

Detailed in FIGS. 6–7 is slot 134 formed in post 50. Slot 134 is generally shaped complementary to an opposed pair of elongated frustums. Stated differently, slot 134 is designed to be widest at its opposed mouths 138 and narrowest at its center 140, thereby permitting some rotation (in, e.g., direction A) of shaft 142 (shown in phantom lines in FIG. 5B) before the shaft 142 contacts surfaces 146 and 150 of slot 134. Hence, each mouth 138 typically is substantially longer than the diameter of shaft 142, although its height is approximately the same as (albeit slightly larger than) the diameter of the shaft 142.

Figure 8A:
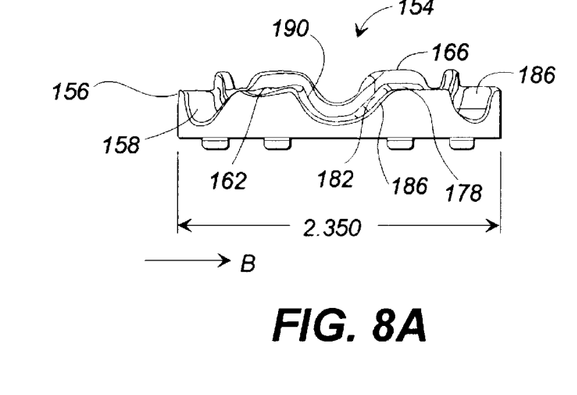
FIGS. 8A–B are, respectively, side and perspective views of the "cam" of the valve assembly of FIG. 1.
Figure 8B:
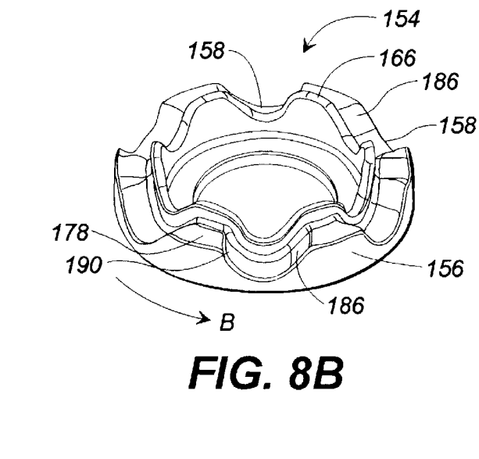

Interposed between knob 98 and housing 14 and circumscribing post 50 is cam 154 (see FIGS. 8A–B). Included in the upper portion 156 of cam 154 are recesses 158 and indentations 162, of which there are preferably six and two, respectively. Fewer or greater numbers of these recesses 158 and indentations 162 may be included, however, and upper portion 156 may furthermore contain an integrally-formed guide rail 166 if desired to prevent followers (or rollers) 170A–B from sliding off upper portion 156 toward post 50.

Recesses 158 receive the followers 170A–B, which are attached adjacent respective ends 174A–B of shaft 142. Each reception of followers 170A–B by recesses 158 defines a distinct operational position of assembly 10, selectively positioning rotor 78 vis-a-vis segments 74 and sealing gasket 94 against walls 66A–E, central wall 67, and peripheral wall 68. By contrast, when followers 170A–B are not received by recesses 158 (but rather are travelling along surface 178 of upper portion 156 or resting in indentations 162), rotor 78 effectively is "lifted" relative to lower housing 18 so that gasket 94 no longer abuts walls 66A–E, central wall 67, and peripheral wall 68. This "lifting" action destresses gasket 94, avoiding its frictional contact with walls 66A–E, 67, and 68 when knob 98 is turned. Placing followers 170A–B in indentations 162 represents the "storage" or "winter" position of assembly 10, as it reduces deterioration of gasket 94 that might otherwise be caused by longstanding contact with walls 66A–E, 67, and 68.

Phantom line 182 illustrates the boundary of a recess 158 were it semi-circularly shaped. As shown especially in FIG. 6, however, recesses 158 are asymmetrically shaped, having a decreased slope on the leading surface 186 encountered by a follower 170 moving in direction B. Because trailing surface 190 substantially complements the shape of a follower 170, knob 98 cannot as readily be turned in the direction opposite direction B. Accordingly, cam 154 effectively restricts movement of knob 98 to unidirectional (typically counterclockwise) motion.

With followers 170A–B positioned in a particular pair of recesses 158, a consumer may utilize assembly 10 merely by turning knob 98. Because ends 174A–B of shaft 142 are fitted within respective internal recesses 192A–B of knob 98, turning the knob 98 causes shaft 142 to begin rotating, forcing followers 170A–B to commence climbing the leading surfaces 186 of the particular recesses 158. Continued rotation of shaft 142 eventually causes it to contact surfaces 146 and 150 of slot 134, after which post 50 turns in tandem with the shaft 142. The initial climbing action functions to lift rotor 78, however, thereby destressing gasket 94 to reduce its wear (as noted above) before post 50 and rotor 78 begin to rotate.

Figure 9A:
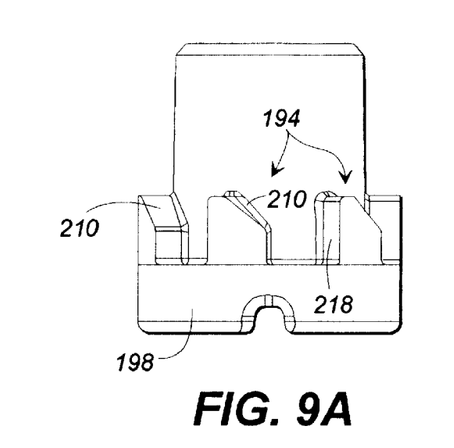
FIGS. 9A–B are, respectively, elevational and perspective views of the "accelerator" gear of the present invention.
Figure 9B:
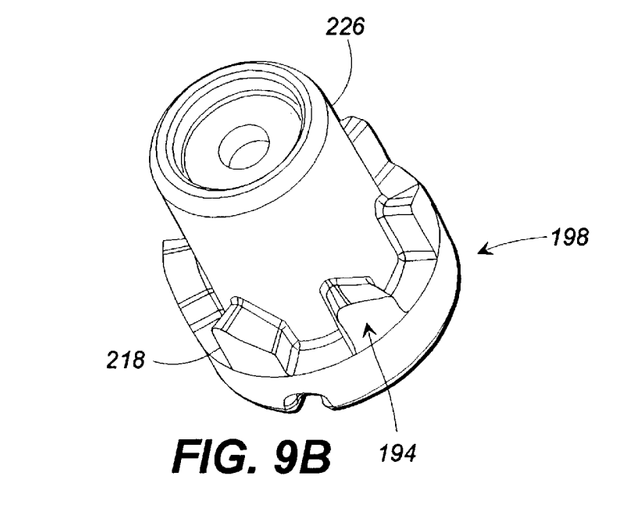
Figure 9C:
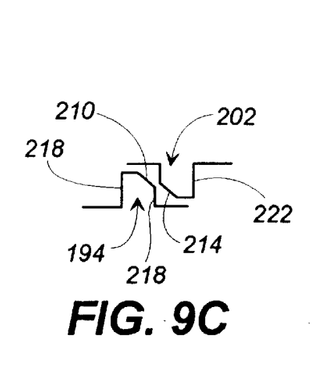
FIG. 9C is an elevational view of a portion of the accelerator gear of FIGS. 9A–B shown engaging teeth of the post of the valve assembly.

FIGS. 9A–C, finally, illustrate teeth 194 of "accelerator" gear 198, which in use engage teeth 202 of the bottom 206 of post 50. Respective sloped edges 210 and 214 of teeth 194 and 202 facilitate proper seating of rotor 78 and gasket 94 as followers 170A–B begin to enter recesses 158. After followers 170A–B are fully received by recesses 158, the vertical side walls 218 and 222 of abutting teeth 194 and 202 prevent unintended changes in position of rotor 78. As shown in FIG. 9B, gear 198 may include an integral sleeve 226 which, if present, is designed to fit over protrusion 230 of lower housing 18 and be secured in place by a fastener such as screw 234.

The foregoing is provided for purposes of illustrating, explaining, and describing embodiments of the present invention. Modifications and adaptations to these embodiments will be apparent to those skilled in the art and may be made without departing from the scope or spirit of the invention.

We claim:

1. A valve assembly comprising:
    a. a housing defining:
        i. an inlet adapted to receive fluid;
        ii. an outlet; and
        iii. a passageway for the received fluid to flow to the outlet;
    b. a rotor for selectively permitting the received fluid to flow to the outlet;
    c. means for sealing at least a portion of the passageway when the rotor in is a first position and not sealing that portion of the passageway when the rotor is in a second position; and
    d. means for selectively placing the rotor in one of the first and second positions, comprising:
        i. a post connected to the rotor and having a slot therethrough;
        ii. a shaft positioned within the slot;
        iii. a follower connected to the shaft; and
        iv. a cam having an asymmetrically-shaped recess for receiving the follower, so that when the follower is received by the recess the rotor in placed in the first position and when the follower is not received by the recess the rotor is placed in the second position.

2. A valve assembly according to claim 1 further comprising means for effecting rotation of the shaft.

3. A valve assembly according to claim 2 in which:
    a. the shaft has an end; and
    b. the shaft rotation-effecting means comprises a knob (i) coupled to the post and (ii) having an internal recess for receiving the end of the shaft.

4. A valve assembly according to claim 1 in which the slot has a mouth and the shaft has a diameter smaller than the length of the mouth of the slot so as to permit movement of the shaft within the slot.

5. A valve assembly according to claim 3 in which the slot has a mouth and the shaft has a diameter smaller than the length of the mouth of the slot so as to permit movement of the shaft within the slot.

6. A valve assembly according to claim 1 in which the housing comprises upper and lower portions, the upper portion defining the inlet and the lower portion defining the outlet.

7. A valve assembly according to claim 6 in which:
    a. the lower portion defines an internal peripheral wall; and
    b. the sealing means comprises a gasket attached to the rotor so that when the rotor is in the first position, the gasket abuts the peripheral wall, and when the rotor is in the second position, the gasket does not abut the peripheral wall.

8. A valve assembly according to claim 6 in which the lower portion defines a port adapted to function as at least one of an inlet to and an outlet from the housing.

9. A valve assembly according to claim 8 in which the rotor is adapted to permit fluid to communicate selectively between (a) the inlet defined by the upper portion and the port and (b) the port and the outlet defined by the lower portion.

10. A valve assembly for use in connection with a swimming pool and an associated water pump, comprising:
    a. a housing formed of:
        i. an upper portion having a top surface, defining an inlet for connection to the water pump, and having an opening in the top surface;
        ii. a lower portion (A) adapted for connection to the upper portion, (B) having an internal peripheral wall, and (C) defining four ports and five internal cavities, each port communicating with a different one of the internal cavities and one of the internal cavities not communicating with any port;
    b. a rotor positioned within the housing;
    c. a gasket connected to the rotor;
    d. a post (i) connected to the rotor, (ii) defining a slot having a mouth, (iii) having a toothed bottom, and (iv) extending through the opening in the top surface of the upper portion of the housing;
    d. a knob coupled to the post and having interior recesses;
    e. a cam (i) interposed between the knob and the top surface of the upper portion of the housing, (ii) having an upper surface, (iii) defining in the upper surface multiple spaced recesses generally but not wholly semi-circular in shape, and (iii) defining in the upper surface multiple spaced indentations;

f. a shaft extending through the slot, having diameter smaller than the length of the mouth of the slot, and having ends received by the interior recesses of the knob;

g. followers positioned about the ends of the shaft, each follower adapted (i) to travel along the upper surface of the cam, (ii) to be received by selected ones of the recesses in the upper surface of the cam, and (iii) to rest in the indentations in the upper surface of the cam, so that when the followers are received by recesses in the upper surface of the cam, the gasket abuts the internal peripheral wall of the lower portion of the housing and when the followers are not so received, the gasket does not abut the internal peripheral wall of the lower portion of the housing;

h. a spring positioned within the housing and circumscribing the post so as to bias the gasket toward the internal peripheral wall of the lower portion of the housing; and i. a toothed gear connected to the lower portion of the housing and which engages the teeth of the bottom of the post when the followers are received by recesses in the upper surface of the cam.

11. A valve assembly according to claim 7 in which the lower portion additionally defines a central wall spaced from the peripheral wall and a plurality of walls spanning the distance between the central wall and the peripheral wall.

12. A valve assembly according to claim 11 in which the gasket additionally abuts the central wall and the plurality of walls when the rotor is in the first position.

* * * * *